US007850851B2

(12) United States Patent
Zha et al.

(10) Patent No.: US 7,850,851 B2
(45) Date of Patent: Dec. 14, 2010

(54) BIOLOGICAL PHOSPHORUS REMOVAL

(75) Inventors: Fufang Zha, New South Wales (AU); Edward John Jordan, Lenexa, KS (US)

(73) Assignee: Siemens Water Technologies Corp., Warrendale, PA (US)

( * ) Notice: Subject to any disclaimer, the term of this patent is extended or adjusted under 35 U.S.C. 154(b) by 357 days.

(21) Appl. No.: 12/063,325

(22) PCT Filed: Aug. 14, 2006

(86) PCT No.: PCT/AU2006/001162

§ 371 (c)(1),
(2), (4) Date: Feb. 8, 2008

(87) PCT Pub. No.: WO2007/019617

PCT Pub. Date: Feb. 22, 2007

(65) Prior Publication Data

US 2010/0133177 A1 Jun. 3, 2010

(30) Foreign Application Priority Data

Aug. 12, 2005 (AU) ............................... 2005904377

(51) Int. Cl.
*C02F 3/30* (2006.01)

(52) U.S. Cl. .................. 210/605; 210/623; 210/903; 210/906

(58) Field of Classification Search ................ 210/605, 210/609, 620, 621, 623, 630, 903, 906
See application file for complete search history.

(56) References Cited

U.S. PATENT DOCUMENTS 6,485,645 B1 * 11/2002 Husain et al. ............... 210/605

(Continued)

FOREIGN PATENT DOCUMENTS

| WO | WO 01/05715 A1 | 1/2001 |
|---|---|---|
| WO | WO 2006/019256 A1 | 2/2006 |

OTHER PUBLICATIONS

International Search Report dated Oct. 24, 2006 for Application No. PCT/AU2006/001162.

(Continued)

*Primary Examiner*—Fred Prince

(57) ABSTRACT

A process for treating waste water to remove phosphorous and nitrogen in a treatment system including an anaerobic zone (5) containing an anaerobic mixed liquor having organisms which release phosphorous into the anaerobic mixed liquor; an anoxic zone (7) containing an anoxic mixed liquor having organisms which uptake phosphorous and denitrify the anoxic mixed liquor and an aerobic zone (9) containing an aerobic mixed liquor having organisms which uptake phosphorous and nitrify the aerobic mixed liquor; the process including the steps of providing wastewater to be treated into the anaerobic zone (5) and communicating anaerobic mixed liquor from the anaerobic zone (5) to the anoxic zone (7). The anoxic mixed liquor is then communicated from the anoxic zone (7) to the anaerobic zone (5) and the anoxic mixed liquor from the anoxic zone (7) to the amble zone (9). The aerobic mixed liquor is applied to a feed side of a membrane filter (10) to produce a treated effluent from a filtrate side of the membrane filter (10). Oxygen-containing gas bubbles is flowed past the feed side of the membrane filter (10) to remove accumulated solids. At least some of the material rejected by the membrane filter (10) is communicated to a degassing device (20) to remove some or all of any dissolved oxygen contained in the rejected material and the degassed material is communicated to the anoxic zone (7).

6 Claims, 3 Drawing Sheets

U.S. PATENT DOCUMENTS

| | | | |
|---|---|---|---|
| 6,706,185 B2 * | 3/2004 | Goel et al. | 210/605 |
| 6,712,970 B1 | 3/2004 | Trivedi | 210/605 |
| 2002/0117444 A1 | 8/2002 | Mikkelson et al. | 210/605 |
| 2005/0045557 A1 * | 3/2005 | Daigger et al. | 210/605 |
| 2008/0277340 A1 * | 11/2008 | Hong et al. | 210/620 |

OTHER PUBLICATIONS

International Report on Patentability dated Jul. 13, 2007 for Application No. PCT/AU2006/001162.

* cited by examiner

BIOLOGICAL PHOSPHORUS REMOVAL

CROSS REFERENCE TO RELATED APPLICATIONS

This application is a U.S. national stage application and claims the benefit under 35 U.S.C. §371 of International Application No. PCT/AU2006/001162 filed on Aug. 14, 2006, entitled BIOLOGICAL PHOSPHOROUS REMOVAL, which claims priority to Australian Provisional Patent Application No. 2005904377 filed on Aug. 12, 2005, entitled BIOLOGICAL PHOSPHORUS REMOVAL, each of which is entirely incorporated herein by reference for all purposes, and to which this application claims the benefit of priority.

TECHNICAL FIELD

This invention relates to biological phosphorus removal in a membrane bioreactor.

BACKGROUND OF THE INVENTION

A typical process for removing phosphorus using a membrane filtration is described in U.S. Pat. No. 6,485,645. The system described uses a membrane to filter mixed liquor received from the aerobic zone. The material to rejected by the membrane filter is removed from the process by returning the material (activated sludge) to the aerobic and anoxic zones. In a membrane bioreactor process the membranes are typically kept clean by flowing air bubbles past the membrane surfaces. This results in the returned activated sludge (RAS) to anoxic tank normally containing high amounts of dissolved oxygen (DO) due to extra air which is supplied for cleaning the membranes. The return activated sludge rich in dissolved oxygen not only consumes more carbon source, but also significantly impacts on phosphorus removal.

DISCLOSURE OF THE INVENTION

According to one aspect the present invention provides a process for treating waste water to remove phosphorous and nitrogen in a treatment system including an anaerobic zone containing an anaerobic mixed liquor having organisms which release phosphorous; an anoxic zone containing an anoxic mixed liquor having denitrifying phosphorus accumulating organisms which uptake phosphorous and an aerobic zone containing an aerobic mixed liquor having organisms which further uptake phosphorous; the process including the steps of:

(a) providing wastewater to be treated into the anaerobic zone;
(b) communicating anaerobic mixed liquor from the anaerobic zone to the anoxic zone;
(c) communicating anoxic mixed liquor from the anoxic zone to the anaerobic zone;
(d) communicating anoxic mixed liquor from the anoxic zone to the aerobic zone;
(e) applying aerobic mixed liquor to a feed side of a membrane filter;
(f) producing a treated effluent from a filtrate side of the membrane filter;
(g) flowing oxygen-containing gas bubbles past the feed side of said membrane filter to remove accumulated solids;
(h) communicating at least some of the material rejected by the membrane filter to a degassing device to remove some or all of any dissolved oxygen contained in said rejected material; and
(i) communicating said degassed material to the anoxic zone.

Preferably, a portion of said material is also communicated to the aerobic zone.

BRIEF DESCRIPTION OF THE DRAWINGS

A preferred embodiment of the invention will now be described, by way of example only, with reference to the accompanying drawings in which.

DESCRIPTION OF PREFERRED EMBODIMENT

Figure 1:
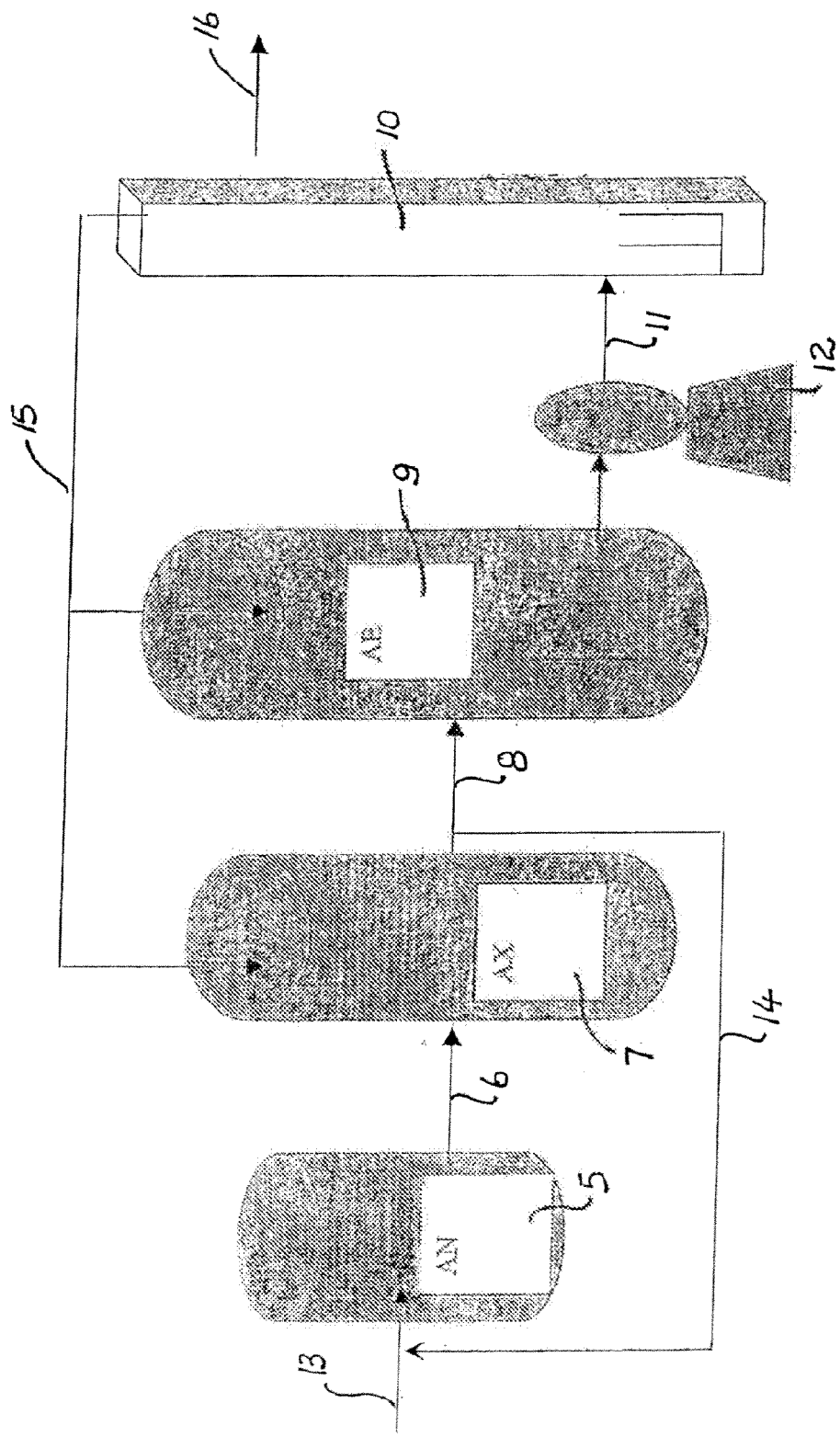
FIG. 1 shows a schematic diagram of a prior art wastewater treatment process employing a membrane filter.

Referring to FIG. 1 there is shown a prior art treatment system and process.

The treatment system comprises an anaerobic zone 5 in fluid communication via line 6 with an anoxic zone 7 which, in turn, is in fluid to communication via line 8 with an aerobic zone 9. The aerobic zone 9 is in fluid communication with a membrane filter 10 via line 11 and a pump 12.

In use, wastewater to be treated is provided through line 13 to the anaerobic zone 5 to join anaerobic mixed liquor contained therein. The anaerobic mixed liquor is flowed from the anaerobic zone 5 through line 6 to the anoxic zone 7 where it mixes with anoxic mixed liquor contained therein. Anoxic mixed liquor is flowed from the anoxic zone to both the anaerobic zone 5 and the aerobic zone 9 through lines 14 and 8 respectively. Anoxic mixed liquor is then mixed with the aerobic mixed liquor in the aerobic zone 9. Aerobic mixed liquor is pumped by pump 9 or by gravity into membrane filter 10 and applied to the feed side of the membrane/s.

Filtrate from the membrane filter 10 is drawn off through line 16 and activated sludge rejected by the filter 10 is fed back to the aerobic zone 9 and anoxic zone 7 through line 15.

Figure 2:
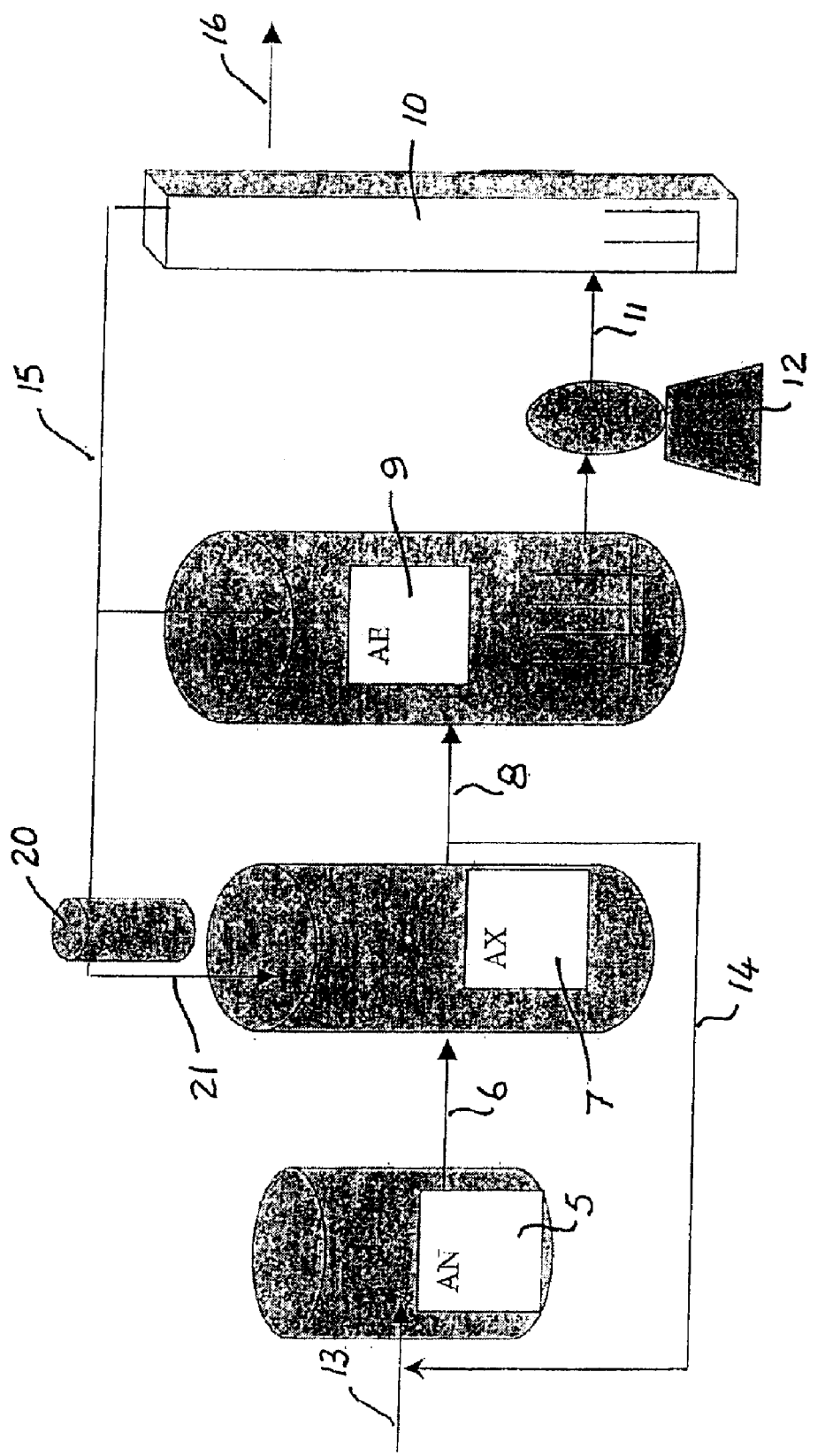
FIG. 2 shows a schematic diagram of a wastewater treatment process according to one embodiment of the invention.

The embodiment of the invention shown in FIG. 2 is substantially the same as the arrangement shown in FIG. 1, however, a degassing compartment 20 is added to line 15 before anoxic zone 7 to accommodate returned activated sludge. The size of the compartment 20 is such that the residence time is preferably in the range of about 0.5 to 30 minutes. The return activated sludge is degassed and the dissolved oxygen is quickly exhausted in the compartment 20 before entering anoxic zone 7 through line 21.

As the main purpose of degassing device is to remove extra dissolved oxygen contained in the return mixed liquor, it will be appreciated that the degassing device can be arranged in a number different ways within the treatment system to achieve this purpose. FIG. 2 shows one arrangement. The device can also be integrated in the anoxic tank and the mixed liquor after degassing flows from the degassing device to the anoxic zone.

In some membrane bioreactors, membrane filters are arranged in the aerobic tank and form part of the aerobic zone. Part of mixed liquor from the end of the aerobic zone is then transferred to anoxic zone for denitrification. The returned mixed liquor in such arrangements is treated in the same manner as described above, that is, at least part of the returned mixed liquor is degassed through degassing device before entering the anoxic zone.

Figure 3:
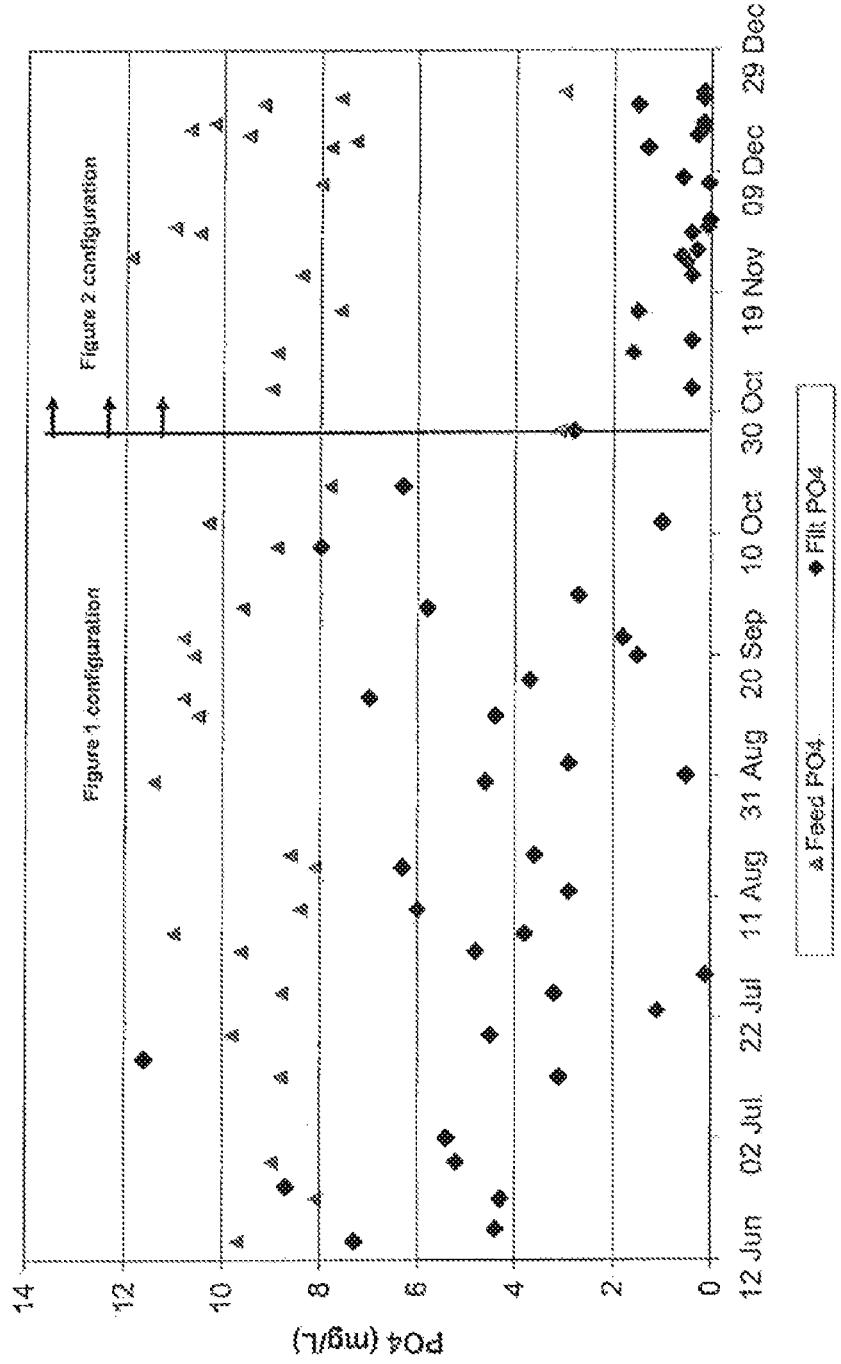
FIG. 3 shows a comparison of phosphorus levels over time for the prior art process and the process according to the embodiment shown in FIG. 2.

A significant improvement on phosphorus removal is observed over the processes described in the prior art. FIG. 3 shows a comparison of phosphorus level left in the filtrate with configurations shown in FIGS. 1 and 2, respectively. For the configuration of FIG. 1, biological phosphorus removal was poor. With the configuration shown in FIG. 2, a phosphorus level less than 2 mg/L can be achieved for the feed Chemical Oxygen Demand (COD)/Total Kjeldahl Nitrogen (TKN) <10.

It will be appreciated that the processes described may be continuous or variable dependent on inflow of wastewater.

In addition to the phosphorous removal achieved using the above-described process further reductions can be achieved using chemical dosing. Tables A and B illustrate the effect of the enhanced biological phosphorous removal process on the level of chemical additives needed to achieve desired effluent phosphorous levels.

TABLE A

Estimated Al/P Ratio for Enhanced Biological Phosphorous Removal with Chemical Addition vs Chemicals Only

| Effluent Requirement | Chemical Addition Only | Enhanced Biological Phosphorous Removal With Chemical in Anaerobic Zone | Enhanced Biological Phosphorous Removal With Chemical in Aerobic Zone |
|---|---|---|---|
| 1.0 mg/L | 1.5 | | |
| 0.5 mg/L | 2.3 | 1.0 | 2.2 |
| 0.1 mg/L | 4.0 | 1.0 | 4.0 |

(assumes Enhanced Biological Phosphorous Removal Effluent P = 1.0 mg/L)

TABLE B

Alum Requirements Reduced with Enhanced Biological Removal Dose in lb/day (11 lb alum per lb Al)

| Effluent Requirement | Chemical Addition Only | Enhanced Biological Phosphorous Removal With Chemical in Anaerobic Zone | Enhanced Biological Phosphorous Removal With Chemical in Aerobic Zone |
|---|---|---|---|
| 1.0 mg/L | 1920 | | |
| 0.5 mg/L | 2940 | 90 | 200 |
| 0.1 mg/L | 5110 | 160 | 650 |

Influent Phosphorous = 8 mg/L, 2 Mgal/d

It will be appreciated that further embodiments and exemplifications of the invention are possible without departing from the spirit or scope of the invention described.

The invention claimed is:

1. A process for treating waste water to remove phosphorous and nitrogen in a treatment system including an anaerobic zone including an anaerobic mixed liquor having organisms which release phosphorous; an anoxic zone including an anoxic mixed liquor having denitrifying phosphorous accumulating organisms which uptake phosphorous and an aerobic zone including an aerobic mixed liquor having organisms which further uptake phosphorous; the process comprising the steps of:
   (a) providing wastewater to be treated into the anaerobic zone;
   (b) communicating anaerobic mixed liquor from the anaerobic zone to the anoxic zone;
   (c) communicating anoxic mixed liquor from the anoxic zone to the anaerobic zone;
   (d) communicating anoxic mixed liquor from the anoxic zone to the aerobic zone;
   (e) applying aerobic mixed liquor to a feed side of a membrane filter;
   (f) producing a treated effluent from a filtrate side of the membrane filter;
   (g) flowing oxygen-containing gas bubbles past the feed side of said membrane filter to remove accumulated solids;
   (h) communicating at least some of the material rejected by the membrane filter to a degassing device to remove some or all of any dissolved oxygen contained in said rejected material; and
   (i) communicating said degassed material to the anoxic zone.

2. A process according to claim 1 including the step of communicating a portion of said material to the aerobic zone.

3. A process according to claim 1 wherein residence time of the material in said degassing device is between about 0.5 to about 30 minutes.

4. A process according to claim 1 wherein the membrane filter forms part of the aerobic zone.

5. A process according to claim 4 wherein the aerobic zone is formed by an aerobic tank and said membrane filter is located within said aerobic tank.

6. A process according to claim 1 wherein the anoxic zone is formed by an anoxic tank and said degassing device is integrated with said anoxic tank.

* * * * *